(12) United States Patent
Zhang et al.

(10) Patent No.: US 11,671,709 B2
(45) Date of Patent: Jun. 6, 2023

(54) ANTI-VIBRATION ACTUATOR CONTROL METHOD

(71) Applicant: CHIPSEMI SEMICONDUCTOR (NINGBO) CO., LTD., Ningbo (CN)

(72) Inventors: Yaoguo Zhang, Ningbo (CN); Bo Xia, Ningbo (CN); Yulin Zhang, Ningbo (CN)

(73) Assignee: CHIPSEMI SEMICONDUCTOR (NINGBO) CO., LTD., Ningbo (CN)

( * ) Notice: Subject to any disclaimer, the term of this patent is extended or adjusted under 35 U.S.C. 154(b) by 0 days.

(21) Appl. No.: 17/551,173

(22) Filed: Dec. 14, 2021

(65) Prior Publication Data

US 2022/0191373 A1 Jun. 16, 2022

(30) Foreign Application Priority Data

Dec. 14, 2020 (CN) .......................... 202011464075.7

(51) Int. Cl.
*H04N 5/232* (2006.01)
*H02K 11/21* (2016.01)
*H04N 23/68* (2023.01)

(52) U.S. Cl.
CPC ........... *H04N 23/685* (2023.01); *H02K 11/21* (2016.01)

(58) Field of Classification Search
USPC ........................................ 396/55; 348/208.99
See application file for complete search history.

(56) References Cited

U.S. PATENT DOCUMENTS

| 2,674,729 | A | * | 4/1954 | Carter | G05D 3/1436 |
| | | | | | 361/298.1 |
| 7,423,824 | B2 | * | 9/2008 | Yamashita | G02B 7/08 |
| | | | | | 359/704 |
| 7,702,227 | B2 | * | 4/2010 | Ito | G03B 17/18 |
| | | | | | 359/557 |
| 9,218,065 | B2 | * | 12/2015 | Mahameed | G06F 3/0346 |

* cited by examiner

*Primary Examiner* — Clayton E. La Balle
*Assistant Examiner* — Warren K Fenwick
(74) *Attorney, Agent, or Firm* — Javalon Law, P.C.

(57) ABSTRACT

In accordance with the present disclosure, a method for controlling an anti-vibration actuator is provided such that the position of the applied opposite rotation in a gyro stabilization process can be measured using capacitance sensing. In some embodiments, a rotor plate attached to a rotor and a stator plate attached to a stator can be used to create a capacitance. When the rotor moves, a distance change value of the rotor can be calculated based on the capacitance measured between the rotor plate and the stator plate. In these embodiments, the cost and the form factor of the aforementioned anti-vibration actuator are reduced compared to implementation of magnetic field sensors in the anti-vibration actuator.

7 Claims, 7 Drawing Sheets

US 11,671,709 B2

ANTI-VIBRATION ACTUATOR CONTROL METHOD

FIELD OF THE INVENTION

The present application generally pertains to control of anti-vibration actuator.

BACKGROUND OF THE INVENTION

An actuator is a component of a machine that is responsible for moving and controlling a mechanism or system, for example by opening a valve. An actuator requires a control signal and a source of energy. The control signal is relatively low energy and may be electric voltage or current, pneumatic, or hydraulic fluid pressure, or even human power. The source of energy may be an electric current, hydraulic pressure, or pneumatic pressure. When the actuator receives a control signal, it responds by converting the source of energy into mechanical motion. In the electric, hydraulic, and pneumatic sense, it is a form of automation or automatic control.

BRIEF SUMMARY OF THE INVENTION

In accordance with the present disclosure, a method for controlling an anti-vibration actuator is provided such that the position of the applied opposite rotation in a gyro stabilization process can be measured using capacitance sensing. In some embodiments, a rotor plate attached to a rotor and a stator plate attached to a stator can be used to create a capacitance. When the rotor moves, a distance change value of the rotor can be calculated based on the capacitance measured between the rotor plate and the stator plate. In these embodiments, the cost and the form factor of the aforementioned anti-vibration actuator are reduced compared to implementation of magnetic field sensors in the anti-vibration actuator.

In some embodiments, a method of for controlling an anti-vibration actuator is based on a capacitance measured between a rotor plate attached to a rotor and a stator plate attached to a stator. In those embodiments, the method includes moving the rotor towards a predetermined direction for a predetermined distance while keeping the stator stationary; measuring, at a capacitance sensing circuit, the capacitance between the rotor plate and the stator plate; calculating, at a processing unit, a distance change value of the rotor based on the capacitance measured at the capacitance sensing circuit; determining, at the processing unit, whether the distance change value matches the predefined distance; and controlling, at a rotor drive block, the rotor based on whether the distance change value matches the predefined distance.

DETAILED DESCRIPTION OF THE INVENTION

Figure 1:
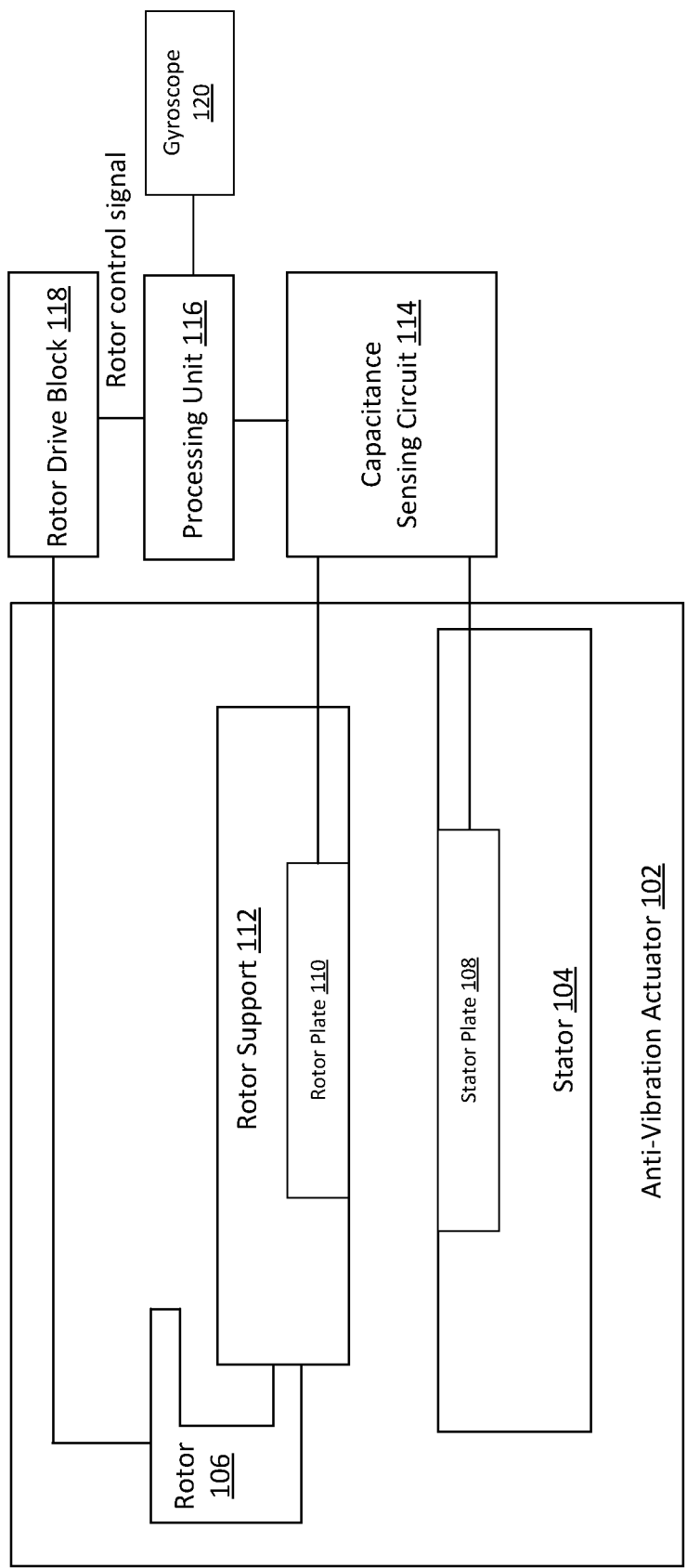
FIG. 1 illustrates an anti-vibration actuator control system 100, according to an exemplary embodiment of the present disclosure.

Particular embodiments of the invention are illustrated herein in conjunction with the drawings.

Various details are set forth herein as they relate to certain embodiments. However, the method can also be implemented in ways which are different from those described herein. Modifications can be made to the discussed embodiments by those skilled in the art without departing from the method. Therefore, the method is not limited to particular embodiments disclosed herein.

An actuator is a mechanism by which a control system acts upon to perform an operation or task. Various types of actuators are used in different applications including mechanical, thermal, electrical, camera, and/or other types of applications. In camera applications, an anti-vibration actuator is used to secure focus and stabilize images by moving a lens within a camera. Key functionalities of an anti-vibration actuator include autofocus, optical image stabilizer, optical zoom, and/or any other functionalities. As camera systems have become more widespread, improving autofocus accuracy has garnered some attention. The challenge is to control the anti-vibration actuator to move the lens with high accuracy to accomplish autofocus.

One necessary step in an autofocus process of a camera is image stabilization. Image stabilization is a technique that allows a camera to correct motion blur through algorithms or small movements of the camera. If a user accidentally taps a camera while taking a photo, the image stabilization will prevent a blurred picture. One way to achieve image stabilization is to use digital stabilization. Digital stabilization works by comparing different image frames and watching for sudden shifts in an overall scene. When sudden shifts occur in images, an algorithm is used to digitally move the images back to where they would be if the camera had remained stable. However, in the digital stabilization, edges of image frames have areas where there is no information and these edges are eliminated by cropping image frames, resulting in information loss in the image frames.

Another way to achieve image stabilization is to use gyro stabilization. Gyro stabilization works by mounting a gyroscope to a camera to sense movements of the camera and apply corrective actions through a camera control unit. A gyroscope may be referred to a device configured to sense angular rotational velocity and acceleration. When a gyroscope senses a camera movement, it sends a command to the camera control unit to counteract that movement by applying an opposite rotation to the camera using an anti-vibration actuator. A magnetic field sensor can be used to measure a position of the applied opposite rotation by detecting changes in a magnetic field surrounding the anti-vibration actuator.

One insight provided by the present disclosure is that implementation of magnetic field sensors in the gyro stabilization can drive up a cost and a form factor (such as a size) of the anti-vibration actuator. Given the same form factor (such as a size) of an anti-vibration actuator, a large form factor (such as a size) of the magnetic field sensor would further limit the form factor (such as a size) of other parts of the anti-vibration actuator such as a rotor. A limited form factor (such as a size) of the rotor in the anti-vibration actuator will in turn decrease an efficiency of the rotor in the anti-vibration actuator.

In accordance with the present disclosure, a method for controlling an anti-vibration actuator is provided such that the position of the applied opposite rotation in a gyro stabilization process can be measured using capacitance sensing. In some embodiments, a rotor plate attached to a rotor and a stator plate attached to a stator can be used to create a capacitance. When the rotor moves, a distance change value of the rotor can be calculated based on the capacitance measured between the rotor plate and the stator plate. In these embodiments, the cost and the form factor of the aforementioned anti-vibration actuator are reduced compared to implementation of magnetic field sensors in the anti-vibration actuator.

FIG. 1 illustrates an anti-vibration actuator control system 100, according to an exemplary embodiment of the present disclosure. In some embodiments, the anti-vibration actuator control system 100 comprises an anti-vibration actuator 102, a capacitance sensing circuit 114, a processing unit 116, a rotor drive block 118, a gyroscope 120, and/or any other components. An anti-vibration actuator 102 may be referred to an actuator in an optical instrument that captures visual images configured to move a lens within the optical instrument to compensate image shifts.

In some embodiments, the anti-vibration actuator 102 includes a stator 104, a rotor 106, a stator plate 108, a rotor plate 110, a rotor support 112, and/or any other component. The stator 104 may be referred to a stationary part of a rotary system such as electric generators, electric motors, sirens, mud motors, biological rotors, anti-vibration actuators, and/or any other rotary systems. Examples of a stator 104 include concentric single layer winding stator, concentric double layer winding stator, fractional concentric winding stator, and/or any other types of stators. The rotor 106 may be referred to a moving component of a rotary system. Examples of a rotor 106 include squirrel-cage rotor, wound rotor, salient pole rotor, non-salient rotor, and/or any other types of rotors.

In this exemplary embodiment, the rotor 106 is attached to a rotor support 112 and a rotor plate 110, and the stator 104 is attached to a stator plate 108. The rotor support 112 may be referred to a metal part attached to the rotor 106 configured to move along with the rotor 106. Examples of a rotor support 112 include iron, copper, silver, aluminum, and/or other types of rotor support. The stator plate 108 and the rotor plate 110 may be referred to two metal plates used to create a capacitor. Examples of a stator plate 108 and a rotor plate 110 include iron plate, copper plate, silver plate, aluminum plate, and/or other types of metal plate.

In this embodiment, the stator plate 108 and the rotor plate 110 are configured to face each other with a distance and an overlap area to create a capacitance: $C = \varepsilon_0 \cdot A/d$, where C is the created capacitance value, $\varepsilon_0$ is an electric constant with $\varepsilon_0 = 8.854 \times 10^{-12}$ F·m$^{-1}$, A is the overlap area between the stator plate 108 and the rotor plate 110, and d is the distance between the stator plate 108 and the rotor plate 110.

The gyroscope 120 is operatively connected to the processing unit 116. A gyroscope 120 may be referred to a device used for measuring or maintaining orientation and angular velocity. Examples of a gyroscope 120 include microelectromechanical systems (MEMS) gyroscope, hemispherical resonator gyroscope, ring laser gyroscope, and/or any other types of gyroscope. In the gyro stabilization, the gyroscope 120 is configured to send a predetermined direction and a predetermined distance to the processing unit 116 for moving the rotor 106.

A processing unit 116 may be referred to an electronic circuitry configured to execute computer instructions to determine a rotor control signal based on a capacitance value received/obtained from the capacitance sensing circuit 114 and the predetermined direction and distance received/obtained from the gyroscope 120. The capacitance sensing circuit 114 may be referred to an electronic circuit configured to measure a capacitance value between two electrically conducting plates. Examples of a capacitance sensing circuit 114 include relaxation oscillator, capacitive divider circuit, and/or any other types of capacitance sensing circuits. A rotor control signal may be referred to a digitally encoded electronic signal used to control the rotor 106. Examples of rotor control signals include digitally encoded electronic signals for move forward action, move backward action, move left action, move right action, move up action, move down action, move distance, and/or any other types of rotor control signals.

In this embodiment, after determining the rotor control signal, the processing unit 116 sends the rotor control signal to the rotor drive block 118. The rotor drive block 118 is operatively connected to the rotor 106. A rotor drive block 118 may be referred to a device configured to produce a force that generates a torque to move the rotor 106 based on a rotor control signal. Examples of a rotor drive block 118 include alternating current-based rotor drive block, magnetic field-based rotor drive block, and/or any other types of rotor drive block.

In some examples, the capacitance sensing circuit 114 is connected to the rotor plate 110 and the stator plate 108 to measure the capacitance between the rotor plate 110 and the stator plate 108. When the rotor 106 moves towards the predetermined direction for the predetermined distance, the attached rotor support 112 and the rotor plate 110 move along with the rotor 106. Meanwhile, the stator 104 and the attached stator plate 108 are kept stationary. A stationary stator 104 and a stationary stator plate 108 may be referred to a stator 104 and a stator plate 108 that are non-moving. The moving rotor plate 110 and the stationary stator plate 108 will change either the overlap area A or the distance d between the two plates, resulting in a change of the capacitance measured at the capacitance sensing circuit 114 as $C = \varepsilon_0 \cdot A/d$. Based on the change of the capacitance measured at the capacitance sensing circuit 114, the processing unit 116 is configured to calculate a distance change value of the rotor 106 and determine whether the distance change value matches the predefined distance. If the distance change value does not match the predefined distance, then the processing unit 116 sends the rotor control signal to the rotor drive block 118 to continue moving the rotor 106 towards the predetermined direction.

Figure 2:
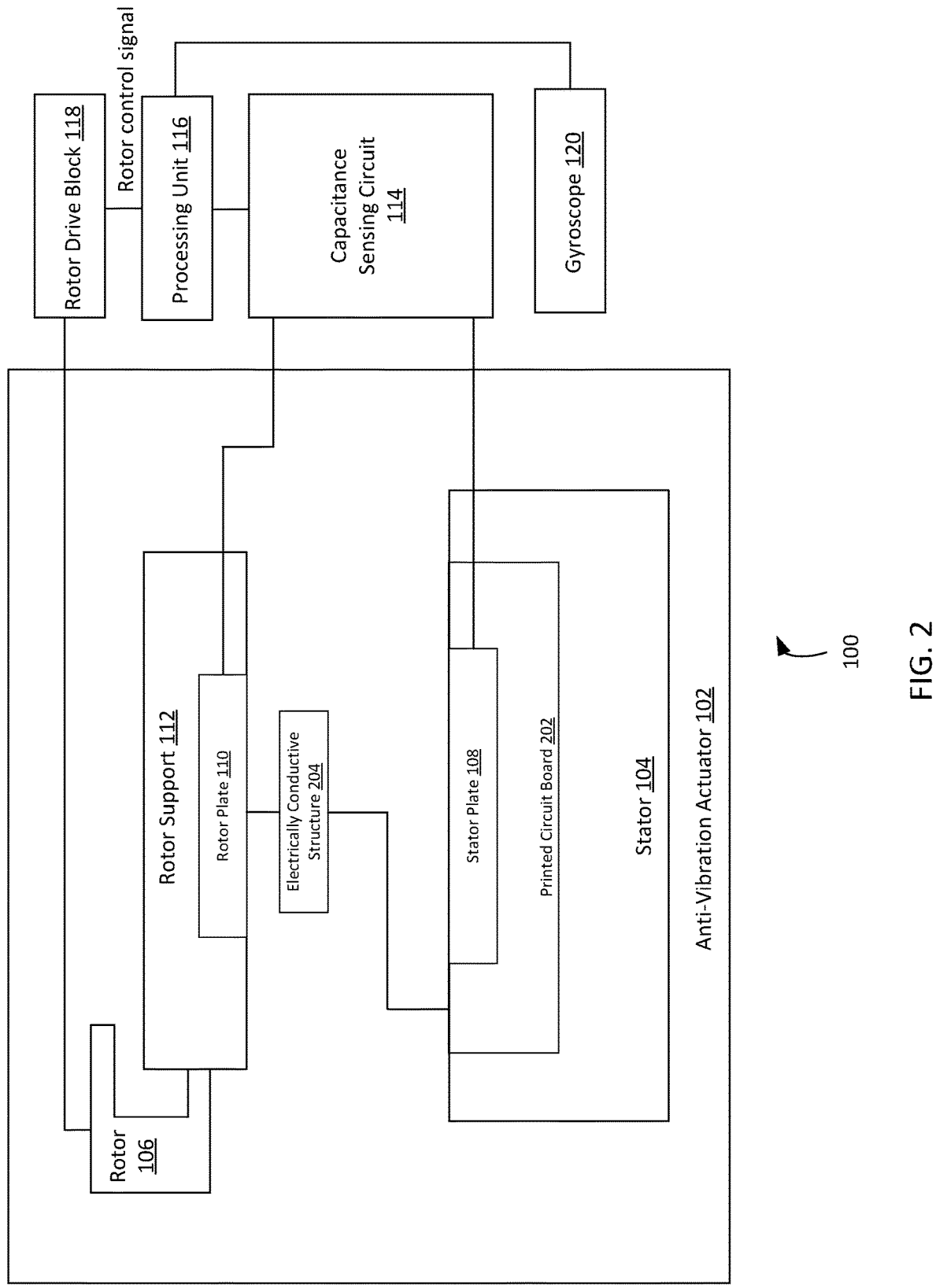
FIG. 2 illustrates another example of the anti-vibration actuator control system 100, according to an exemplary embodiment of the present disclosure.

FIG. 2 illustrates another example of the anti-vibration actuator control system 100, according to an exemplary embodiment of the present disclosure. As can be seen, in this example, the anti-vibration actuator 102 comprises a stator 104, a rotor 106, a stator plate 108, a rotor plate 110, a rotor support 112, a printed circuit board 202, an electrically conductive structure 204, and/or any other component. In this embodiment, the printed circuit board 202 is attached to the stator 104. A printed circuit board 202 may be referred to a laminated sandwich structure of conductive and insulating layers. A printed circuit board 202 may be used to affix electronic components in designated locations on outer layers by means of soldering, and to provide reliable electrical connections between terminals of electronic components in a controlled manner. Examples of a printed circuit board 202 include single layer printed circuit board, double layer printed circuit board, multi-layer printed circuit board, high density interconnect printed circuit board, and/or any other types of printed circuit boards. In some embodiment, an electrically conductive layer of the printed circuit board 202 is used as the stator plate 108 for creating a capacitance between the stator plate 108 and the rotor plate 110. In these embodiments, the cost and the form factor of the anti-vibration actuator 102 are reduced compared to implementation of the anti-vibration actuator 102 with specifically designated stator plate 108.

In this example, the printed circuit board 202 is connected to the rotor plate 110 through the electrically conductive structure 204 to provide a power supply to the rotor plate 110 necessary for capacitance sensing at the capacitance sensing circuit 114. An electrically conductive structure 204 may be referred to material that allows flow of electrical current in one or more directions. Examples of an electrically conductive structure 204 include silver, copper, gold, aluminum, iron, steel, and/or any other types of electrically conductive structures. Providing a power supply directly from the printed circuit board 202 to the rotor plate 110 reduces the cost and the form factor of the anti-vibration actuator 102 compared to implementation of specific power supply for the rotor plate 110 in the anti-vibration actuator 102. Please reference FIG. 1 and its associated texts for structure and functions of other components included in this example.

Figure 3:
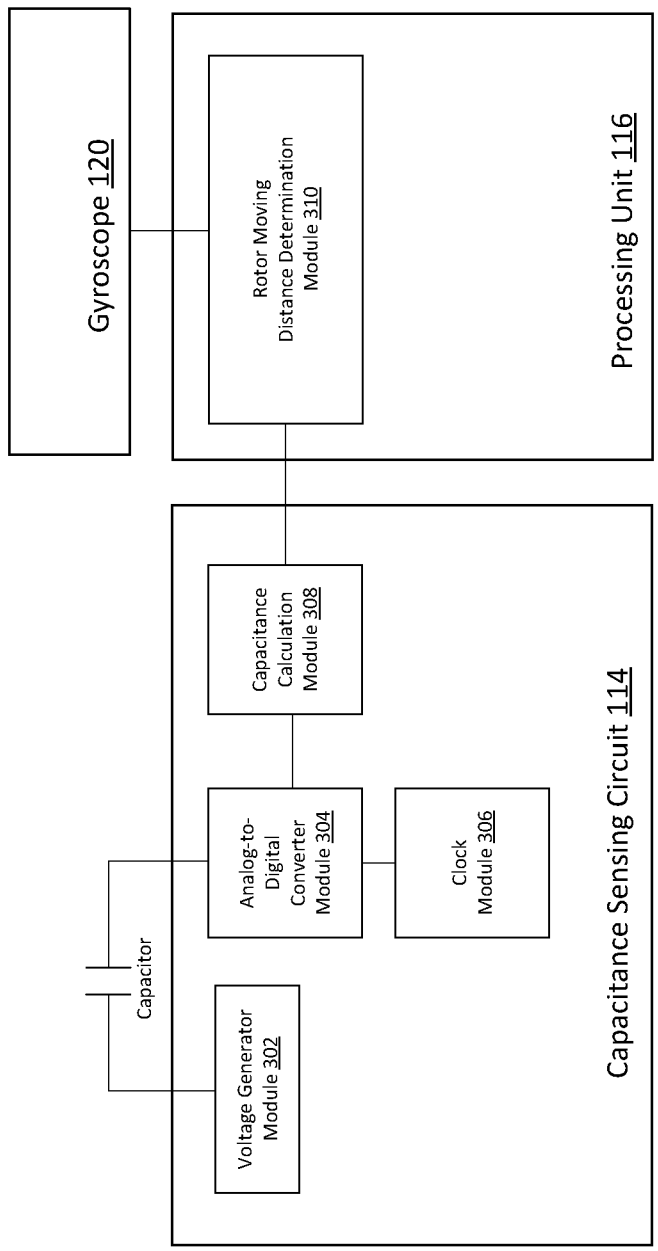
FIG. 3 illustrates an embodiment of a capacitance sensing circuit and a processing unit.

FIG. 3 illustrates an embodiment of the capacitance sensing circuit 114 and the processing unit 116. As can be seen, in this embodiment, the capacitance sensing circuit 114 comprises a voltage generator module 302, an analog-to-digital converter module 304, a clock module 306, a capacitance calculation module 308, and/or any other components. The processing unit 116 comprises a rotor moving distance determination module 310, and/or any other components. A voltage generator module 302 may be referred to an electronic device that generates voltage signals with set properties of amplitude, frequency, and wave shape. Examples of a voltage generator module 302 include function generator, sinusoidal signal generator, pulse-width modulation (PWM) signal generator, arbitrary waveform generator, digital pattern generator, and/or any other types of voltage generators. The analog-to-digital converter module 304 may be referred to an electronic device that converts an analog voltage signal into a digital signal. Examples of an analog-to-digital converter module 304 include flash analog-to-digital converter, successive-approximation analog-to-digital converter, ramp-compare analog-to-digital converter, and/or any other types of analog-to-digital converter. A clock module 306 may be referred to an electronic oscillator that produces a voltage signal that oscillates between a high and a low state at a predetermined frequency. Examples of a clock module 306 include variable frequency oscillator, quartz piezoelectric oscillator, and/or any other types of oscillators. A capacitance calculation module 308 may be referred to a digital circuit configured to determine a capacitance value between the stator plate 108 and the rotor plate 110 based on a digital voltage value received/obtained from the analog-to-digital converter module 304.

In this embodiment, the voltage generator module 302 and the analog-to-digital converter module 304 are operatively connected to two terminals of a capacitor. The analog-to-digital converter module 304 is operatively connected to the capacitance calculation module 308 and the clock module 306. The capacitance calculation module 308 is operatively connected to the rotor moving distance determination module 310 in the processing unit 116.

In one example, the voltage generator module 302 generates a sinusoidal voltage signal at one terminal of the capacitor. A corresponding output voltage signal is created at the other terminal of the capacitor due to existence of a capacitance C between the two terminals of the capacitor. In this example, the analog-to-digital converter module 304 is configured to convert the output voltage signal to a digital signal proportional to the output signal. The conversion from the output voltage signal to the digital signal is synchronized by the clock module 306. Based on the digital signal converted at the analog-to-digital converter module 304 and the sinusoidal voltage signal generated at the voltage generator module 302, the capacitance calculation module 308 is configured to calculate the capacitance C between the two terminals of the capacitor.

In this example, the capacitance calculation module 308 is connected to the rotor moving distance determination module 310 in the processing unit 116. The rotor moving distance determination module 310 may be referred to a digital circuit configured to calculate a distance change value of the rotor 106 and determine whether the distance change value matches a predefined distance value received/obtained from the gyroscope 120. In some embodiments, the predetermined distance value corresponds to a change of the distance value between the stator plate 108 and the rotor plate 110 from d to d+Δd. Based on the formula $C=\varepsilon_0 \cdot A/d$, a change of the distance value from d to d+Δd further results in a change of the capacitance value from C to $C^+=\varepsilon_0 \cdot A/(d+\Delta d)$. The rotor moving distance determination module 310 then compares the capacitance value obtained/received from the capacitance calculation module 308 to $C^+=\varepsilon_0 \cdot A/(d+\Delta d)$ to determine whether the distance change value matches the predefined distance.

Figure 4:
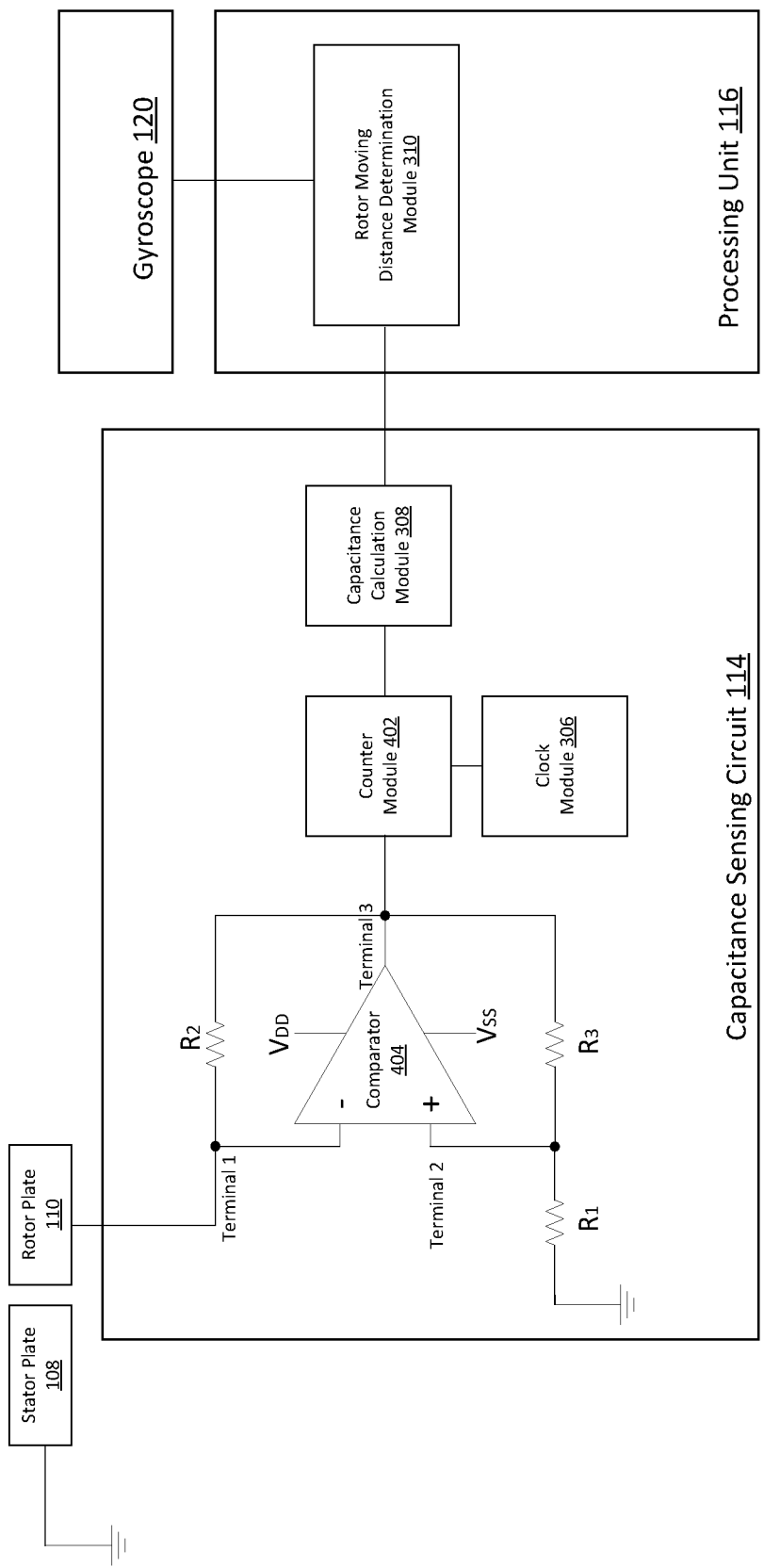
FIG. 4 illustrates another embodiment of the capacitance sensing circuit and the processing unit.

FIG. 4 illustrates another embodiment of the capacitance sensing circuit 114 and the processing unit 116. As can be seen, in this embodiment, the capacitance sensing circuit 114 comprises a clock module 306, a capacitance calculation module 308, a counter module 402, a comparator 404, three resistors R1, R2, R3, one ground, and/or any other components. The processing unit 116 comprises a rotor moving distance determination module 310, and/or any other components. A counter module 402 may be referred to a digital circuit configured to count a number of times a particular event or process has occurred. Examples of a counter module 402 include decade counter, ring counter, Johnson counter, and/or any other types of counters. The comparator 404 may be referred to an electronic circuit that compares two voltages and outputs a digital signal indicating which is larger. Examples of a comparator 404 include operational amplifier comparator, dynamic latched comparator, and/or any other types of comparators.

In this embodiment, terminal 1 of the resistor R2 is connected to the "minus" input of the comparator 404 and the rotor plate 110. Terminal 2 of the resistor R1 and the resistor R3 is connected to the "plus" input of the comparator 404. Terminal 3 of the resistor R2 and the resistor R3 is connected to the output of the comparator 404 and the counter module 402.

In some examples, the resistors R1, R2, and R3 have a resistance value of R, and the comparator 404 is powered up by a higher voltage $V_{DD}$ and a lower voltage $V_{SS}$. A period T of oscillation created at the output of the comparator 404 can be then calculated by the formula:

$$T = (R \cdot C)\left[\ln\left(\frac{2V_{SS} - V_{DD}}{V_{SS}}\right) + \ln\left(\frac{2V_{DD} - V_{SS}}{V_{DD}}\right)\right].$$

The period T is detected at the counter module 402 by measuring a time between two consecutive rising edges of an oscillation at the output of the comparator 404 using the clock module 306. The counter module 402 then sends a value of T to the capacitance calculation module 308. In this way, with known T, R, $V_{DD}$ and $V_{SS}$ values, the capacitance C between the stator plate 108 and the rotor plate 110 can be calculated at the capacitance calculation module 308 using a formula:

$$C = T \bigg/ \left[R \cdot \ln\left(\frac{2V_{SS} - V_{DD}}{V_{SS}}\right) + R \cdot \ln\left(\frac{2V_{DD} - V_{SS}}{V_{DD}}\right)\right].$$

Please reference FIG. 3 and its associated texts for structure and functions of other components included in this example.

Figure 5:
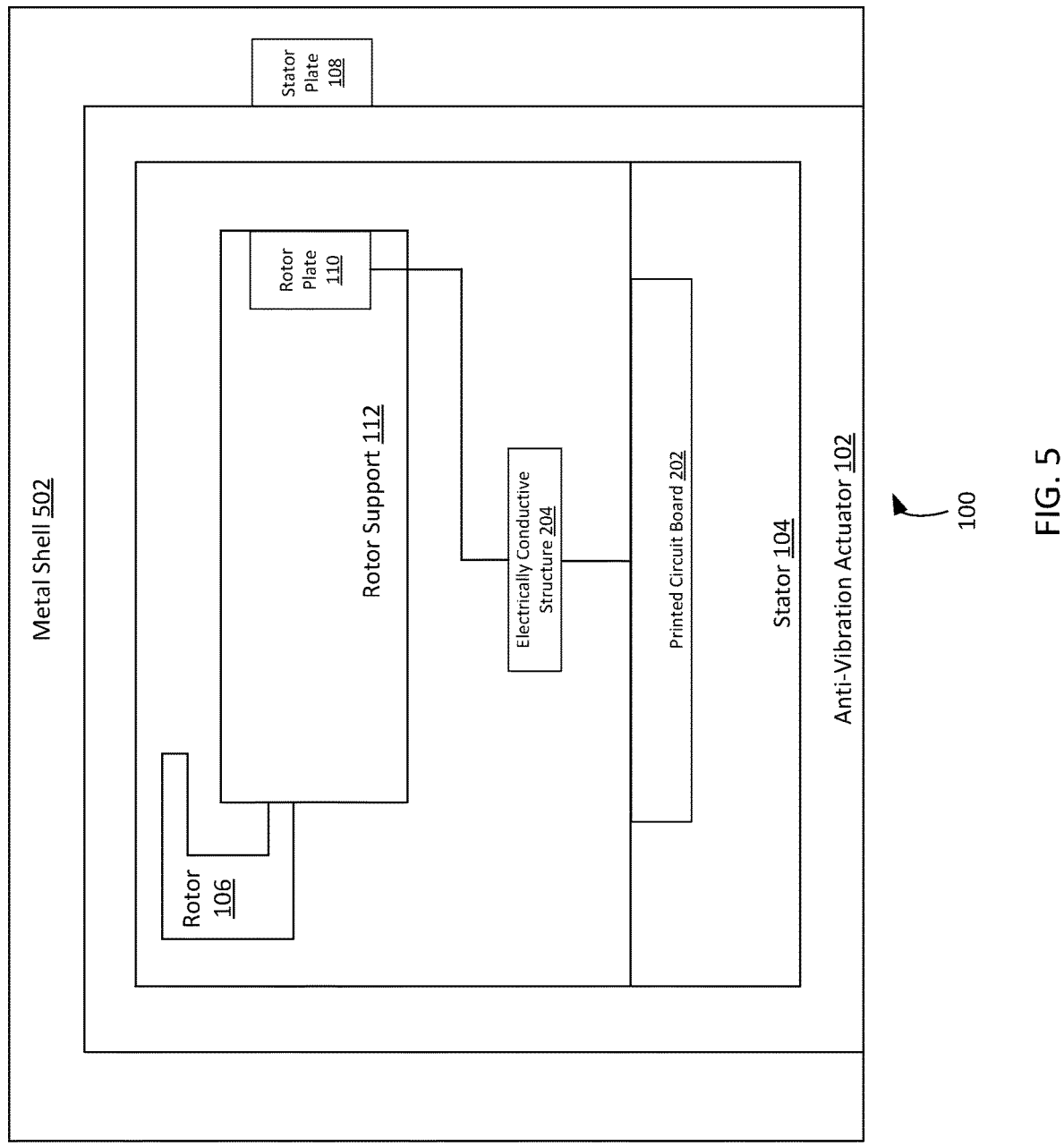
FIG. 5 illustrates yet another example of the anti-vibration actuator control system 100, according to an exemplary embodiment of the present disclosure.

FIG. 5 illustrates yet another example of the anti-vibration actuator control system 100, according to an exemplary embodiment of the present disclosure. As can be seen, in this example, the anti-vibration actuator 102 is covered by a metal shell 502, and the anti-vibration actuator 102 comprises a stator 104, a rotor 106, a rotor plate 110, a rotor support 112, a printed circuit board 202, an electrically conductive structure 204, and/or any other components. A metal shell 502 may be referred to a layer of metal used to cover and protect the anti-vibration actuator 102. Examples of a metal shell 502 include, steel shell, iron shell, copper shell, silver shell, and/or any other types of metal shells.

In this example, the rotor plate 110 is positioned to face an area of the metal shell 502, and the area of the metal shell 502 facing the rotor plate 110 is used as the stator plate 108 for creating a capacitance between the stator plate 108 and the rotor plate 110. In this way, the cost and the form factor of the anti-vibration actuator 102 are reduced compared to implementation of an anti-vibration actuator 102 with specifically designated stator plate 108. Please reference FIG. 1, FIG. 2 and their associated texts for structure and functions of other components included in this example.

Figure 6:
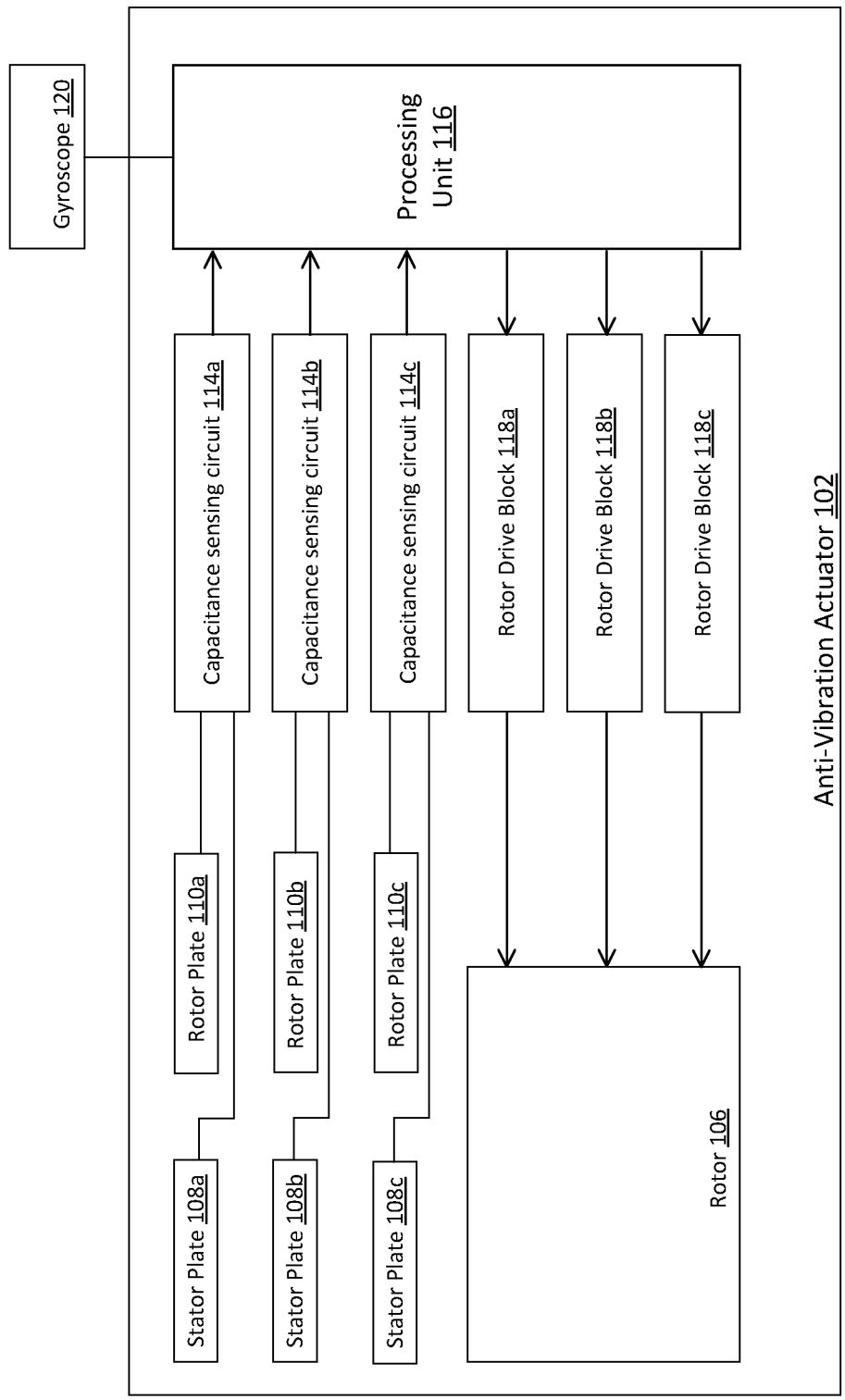
FIG. 6 illustrates still another example of the anti-vibration actuator control system 100, according to an exemplary embodiment of the present disclosure.

FIG. 6 illustrates still another example of the anti-vibration actuator control system 100, according to an exemplary embodiment of the present disclosure. As can be seen, in this example, the anti-vibration actuator 102 comprises a rotor 106, three stator plates 108*a, b* and *c* as shown, three rotor plates 110*a, b* and *c* shown, three capacitance sensing circuits 114*a, b* and *c* as shown, three rotor drive blocks 118*a, b* and *c* as shown, a processing unit 116, and/or any other components. In this example, the processing unit 116 is operatively connected to the gyroscope 120 to receive/obtain three predetermined distances at three predetermined directions. In some embodiments, the three predetermined directions are three mutually perpendicular coordinate axes in a Cartesian coordinate system. In these embodiments, the three predetermined distances correspond to distances that the rotor 106 is configured to move along the three predetermined directions for compensating image shifts in an optical instrument that captures visual images.

In this example, three capacitances are created by three pairs of rotor plates and stator plates: stator plate 108*a* and rotor plate 110*a*, stator plate 108*b* and rotor plate 110*b*, stator plate 108*c* and rotor plate 110*c*. The three created capacitances correspond to the three predetermined distances at the three predetermined directions. The processing unit 116 is configured to receive/obtain the three capacitance values measured at the capacitance sensing circuits 114*a, b* and *c*. Based on the three capacitance values, the processing unit 116 is then configured to calculate three distance change values of the rotor 106 and determine whether the distance change values match the three predefined distances. If one or more of the distance change values do not match the one or more predefined distances, then the processing unit 116 sends rotor control signals to the corresponding rotor drive blocks 118*a-c* for continuing moving the rotor 106 towards one or more predetermined directions.

In one application scenario, the three predetermined distances are dx, dy and dz in three mutually perpendicular predetermined directions x, y and z in a Cartesian coordinate system. The three capacitances created between the stator plates 108*a/b/c* and the rotor plates 110 *a/b/c* are C1/C2/C3. The three capacitances C1, C2 and C3 correspond to the three predetermined directions x, y and z. In this application scenario, the processing unit 116 is configured to calculate the three distance change values of the rotor 160 in the three predetermined directions x, y and z as: dx-delta, dy-delta, and dz. Since the calculated distance change values dx-delta and dy-delta at x and y directions do not match dx and dy, processing unit 116 is configured to send rotor control signals to the rotor drive blocks 118*a* and *b* for continuing moving the rotor 106 towards the x and y directions. Please reference FIG. 1, FIG. 2 and their associated texts for structure and functions of other components included in this example.

Figure 7:
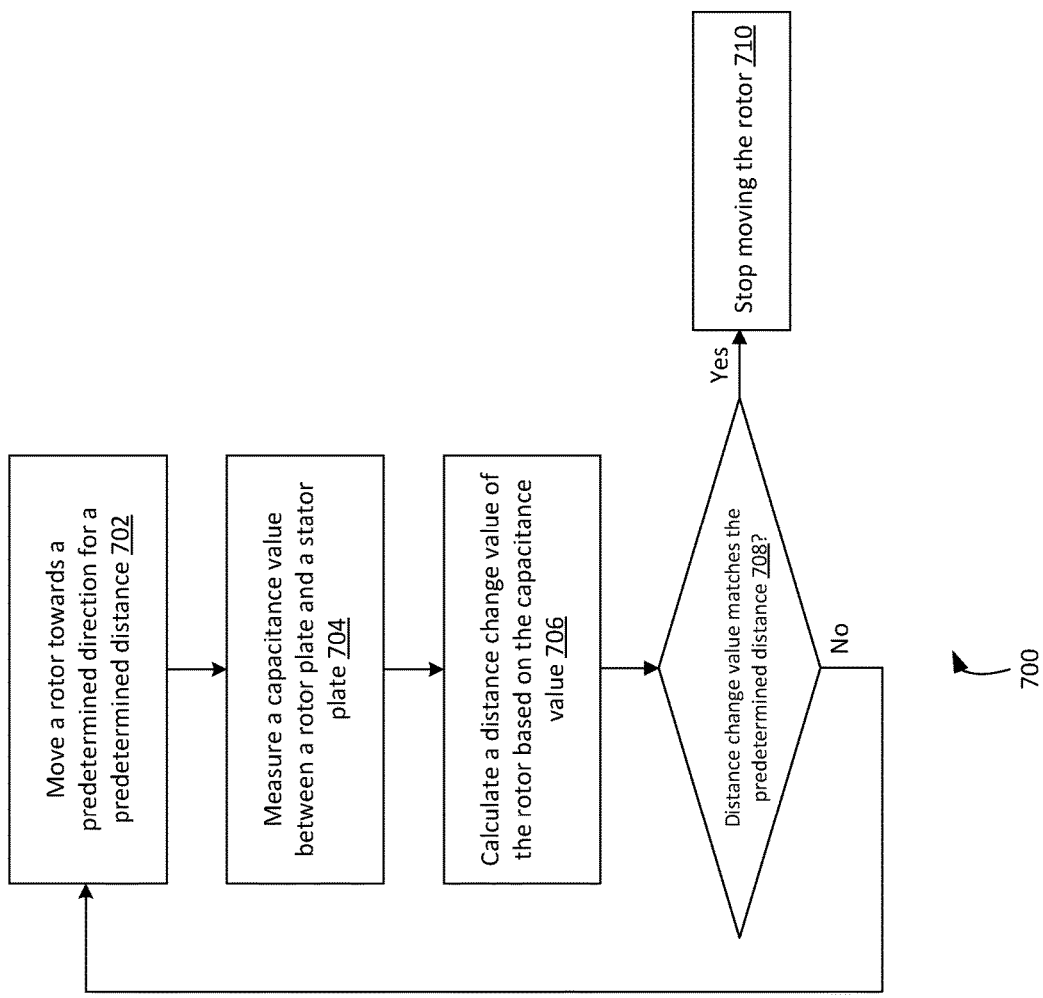
FIG. 7 illustrates an example method for controlling an anti-vibration actuator.

FIG. 7 illustrates an example method 700 for controlling the anti-vibration actuator 102. The operations of method 700 presented below are intended to be illustrative. In some embodiments, method 700 may be accomplished with one or more additional operations not described and/or without one or more of the operations discussed. Additionally, the order in which the operations of method 700 are illustrated in FIG. 7 and described below is not intended to be limiting.

At a 702, a rotor 106 is moved towards a predetermined direction for a predetermined distance. The predetermined direction and the predetermined distance are determined by a gyroscope 120 for compensating image shifts in an optical instrument that captures visual images.

At a 704, a capacitance is measured between a stator plate 108 and a rotor plate 110. The stator plate 108 is attached to a stator 104, and the rotor plate 110 is attached to a rotor 106 and a rotor support 112. When the rotor 106 moves, a distance and an overlap area between the stator plate 108 and the rotor plate 110 change, resulting in a change of the capacitance between the stator plate 108 and the rotor plate 110.

At a 706, a distance change value of the rotor 106 is calculated based on the capacitance measured at 704. In some implementations, a distance change value of the rotor 106 is calculated using a formula $d = \varepsilon_0 \cdot A/C$, where d is the distance between the stator plate 108 and the rotor plate 110, C is the capacitance measured at 704, $\varepsilon_0$ is an electric constant with $\varepsilon_0 = 8.854 \times 10^{-12}$ F·m$^{-1}$, A is an overlap area between the stator plate 108 and the rotor plate 110. In some other implementations, a change in the overlap area between the stator plate 108 and the rotor plate 110 is calculated using a formula $A = d \cdot C/\varepsilon_0$. Then the distance change value of the rotor 106 is calculated based on the change in the overlap area A.

At a 708, the distance change value calculated at 706 is compared to the predetermined distance value. If the distance change value matches the predetermined distance value, then the rotor 106 is stopped from moving. If the distance change value does not match the predetermined distance value, then next step is to go back to 702 to continue to move the rotor 106.

At a 710, the rotor 106 is stopped from moving and kept stationary as the distance change value matches the predetermined distance value.

Though the method for controlling an anti-vibration actuator is disclosed by way of specific embodiments as described above, those embodiments are not intended to limit the present method. Based on the methods and the technical aspects disclosed herein, variations and changes may be made to the presented embodiments by those of skill in the art without departing from the spirit and the scope of the present method.

What is claimed is:

1. A method for controlling an anti-vibration actuator based on a capacitance measured between a rotor plate attached to a rotor and a stator plate attached to a stator, and the method comprising:
    moving the rotor towards a predetermined direction for a predetermined distance while keeping the stator stationary;
    measuring, at a capacitance sensing circuit, the capacitance between the rotor plate and the stator plate;
    calculating, at a processing unit, a distance change value of the rotor based on the capacitance measured at the capacitance sensing circuit;
    determining, at the processing unit, whether the distance change value matches the predefined distance; and
    controlling, at a rotor drive block, the rotor based on whether the distance change value matches the predefined distance.

2. The method in claim 1, further comprising moving the rotor along with a rotor support attached to the rotor and the rotor plate while keeping the stator and the stator plate stationary.

3. The method in claim 1, further comprising measuring the capacitance between the rotor plate and the stator plate by providing a power supply from a printed circuit board to the rotor plate through an electrically conductive structure.

4. The method in claim 1, further comprising measuring the capacitance between the rotor plate and an electrically conductive layer of the printed circuit board serving as the stator plate.

5. The method in claim 1, further comprises measuring the capacitance between the rotor plate and an area of a metal shell facing the rotor plate serving as the stator plate.

6. The method in claim 1, further comprising calculating the distance change value of the rotor at three mutually perpendicular directions in a three-dimensional Cartesian coordinate system based on a set of measured capacitances corresponding to the three mutually perpendicular directions.

7. The method in claim 1, further comprising determining the predetermined direction and the predetermined distance by a gyroscope for compensating image shifts in an optical instrument that captures visual images.

\* \* \* \* \*